United States Patent [19]

Thomasen

[11] Patent Number: 5,240,221
[45] Date of Patent: Aug. 31, 1993

[54] VISCOELASTIC DAMPING SYSTEM

[75] Inventor: Leonard N. Thomasen, Santa Rosa, Calif.

[73] Assignee: Delta Tech Research, Inc., San Carlos, Calif.

[21] Appl. No.: 721,460

[22] PCT Filed: Dec. 29, 1989

[86] PCT No.: PCT/US89/05862

§ 371 Date: Jun. 28, 1991

§ 102(e) Date: Jun. 28, 1991

Related U.S. Application Data

[63] Continuation-in-part of Ser. No. 292,412, Dec. 30, 1988, abandoned, which is a continuation-in-part of Ser. No. 201,981, Jun. 3, 1988, abandoned.

[51] Int. Cl.$^5$ ............................................. F16M 13/00
[52] U.S. Cl. ..................... 248/559; 181/207; 188/379; 267/141.1; 381/158
[58] Field of Search ............. 248/562, 559, 364, 176, 248/160, 622, 633, 634, 638, 676, 632; 211/205; 381/205, 158; 188/379, 380; 267/141.1, 141, 294; 379/454; 181/207, 208, 209

[56] References Cited

U.S. PATENT DOCUMENTS

| | | | |
|---|---|---|---|
| 2,270,902 | 1/1942 | Rubissow | 267/294 X |
| 2,541,159 | 2/1951 | Gieger | 181/208 |
| 3,102,722 | 9/1963 | Hamontre | 188/379 X |
| 3,160,549 | 12/1964 | Caldwell | 181/207 X |
| 3,169,881 | 2/1965 | Bodine | 267/141.1 X |
| 3,386,527 | 6/1968 | Daubert et al. | 181/208 |
| 3,388,772 | 6/1968 | Marsh et al. | 188/379 |
| 4,232,762 | 11/1980 | Bschorr | 188/1 |
| 4,392,681 | 7/1983 | Raquet | 181/209 |
| 4,734,323 | 3/1988 | Sato et al. | 181/208 X |
| 4,778,028 | 10/1988 | Staley | 181/208 |

FOREIGN PATENT DOCUMENTS

| | | | |
|---|---|---|---|
| 209996 | 9/1987 | Japan | 181/208 |
| 2021501A | 4/1979 | United Kingdom | |

OTHER PUBLICATIONS

"Delta Tech Research," *Speaker Builder*, May 1989, p. 6, column 1.

*Primary Examiner*—David L. Talbott
*Attorney, Agent, or Firm*—Limbach & Limbach

[57] ABSTRACT

A vibration damping assembly incorporating an attenuating body formed from viscoelastic material is disclosed. The body may, in a preferred embodiment, be made up of a plurality of plates stacked together and separated with spacers. The viscoelastic material is preferably high impact polystyrene. The damping system is advantageously mounted on an enclosure panel of a loudspeaker to attenuate the vibrations of the panel, thereby minimizing audio signals which usually emanate therefrom and interfere with the desired speaker output.

4 Claims, 4 Drawing Sheets

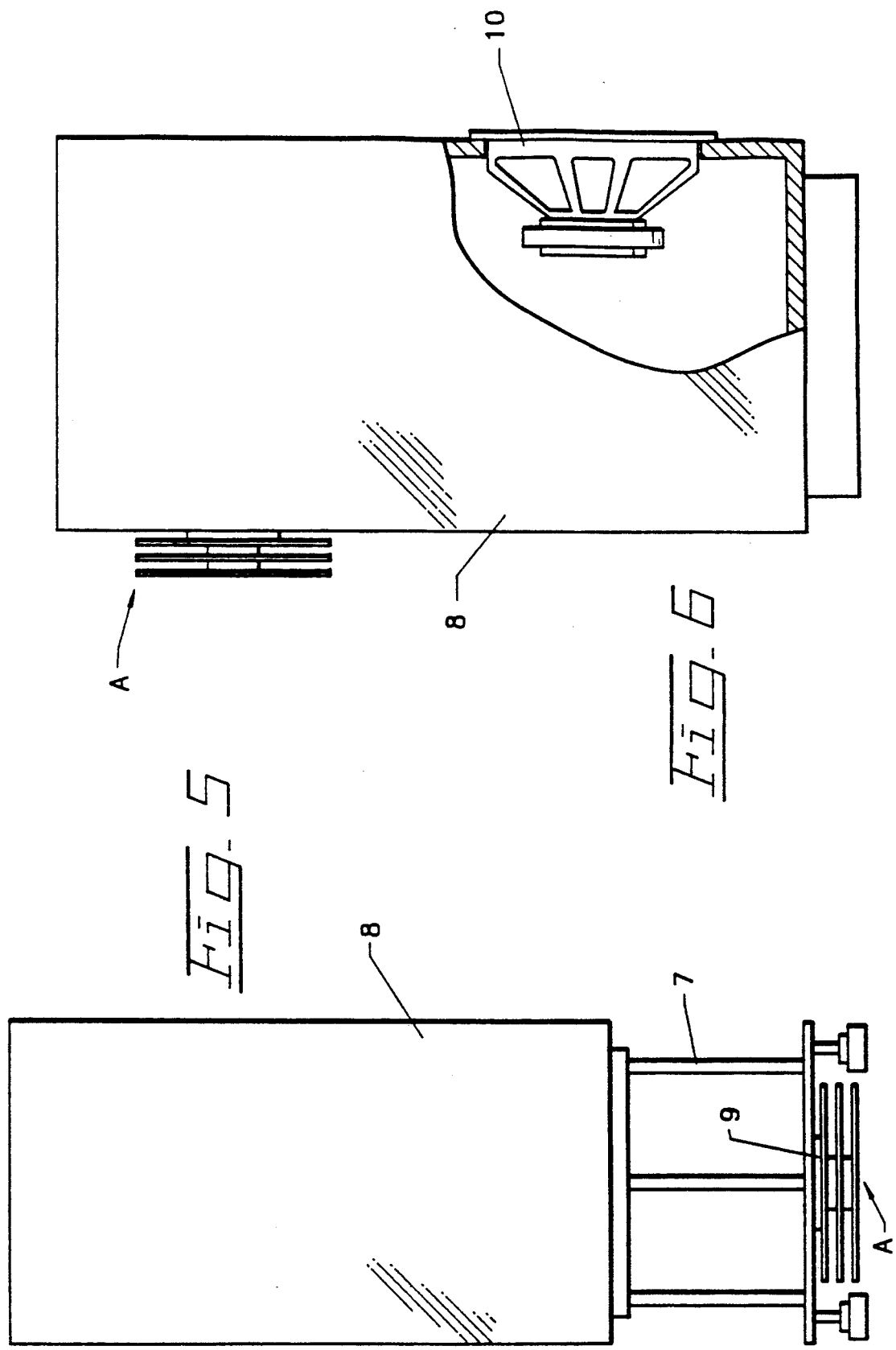

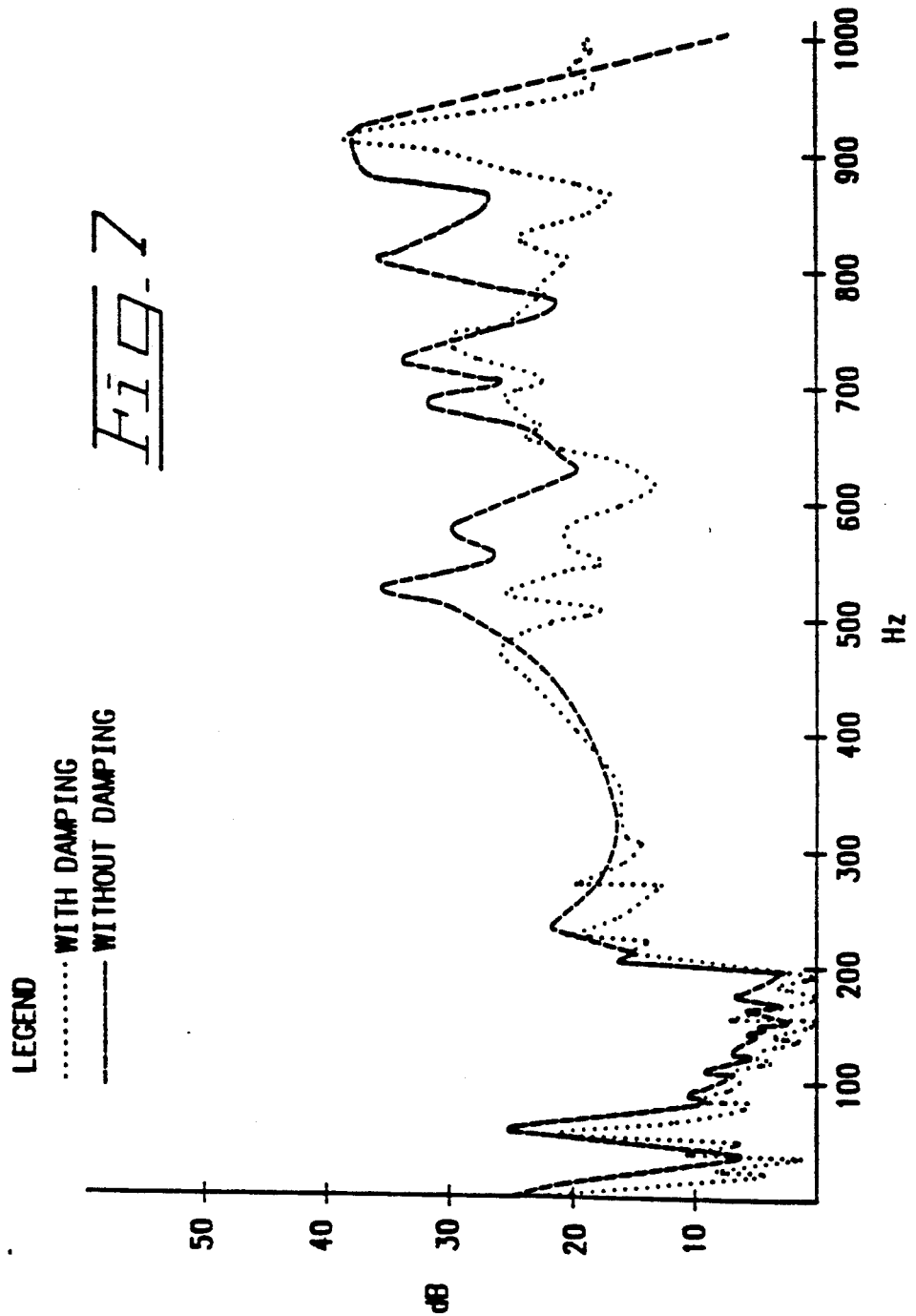

VISCOELASTIC DAMPING SYSTEM

CROSS-REFERENCES TO RELATED APPLICATIONS

This is a continuation in part application of my prior application Ser. No. 07/292,412 filed Dec. 30, 1988 now abandoned which is a continuation in part of my application Ser. No. 07/201,981 filed Jun. 3, 1988 now abandoned.

FIELD OF THE INVENTION

This invention relates to a device and method for attenuating a selected wavelength band of vibrations produced by a vibrating member. More specifically, it is directed to a viscoelastic damping device which may be connected with a vibrating elastic member, such as a loudspeaker enclosure, so as to attenuate those vibrations. Additionally, the invention relates to a method of contacting an assembly including a viscoelastic material with a vibrating member, so as to attenuate a selected wavelength band of vibrations emanating therefrom.

DESCRIPTION OF RELATED ART

The secondary vibrations of an enclosure, for example the enclosure cabinet panels of a loudspeaker, are vibrations which may produce audible sound waves. With a loudspeaker, the acoustic output caused by these secondary vibrations may add or subtract from the output of the loudspeaker, thereby causing the listener to perceive the results as spectral changes or "coloration" of the sound being reproduced by the speaker. Thus, it is desirable to minimize or eliminate these secondary sound waves.

The sound waves that are produced by a loudspeaker's enclosure panels are the result of energy that is injected into these panels by a low-frequency loudspeaker whose functional role is to reproduce the lower frequency range of the sound spectrum. Once this low frequency energy is transferred into the enclosure panels, it is stored as periodic stress and recovered in the form of periodic deformations or, vibrations. The resulting sound waves that these panel vibrations produce in the adjacent air will be dispersed along with the loudspeaker's main-signal energy. The resulting two signals, one being slightly delayed behind the other, will "smear" or interfere with the sound quality of the loudspeaker.

Moreover, at various frequencies, these delayed energy signals will alternately change in their phase relationship with the loudspeaker's main-signal sound waves. This disparity in phase relationships between the two signals over a wide range of frequencies will produce peaks and dips in the loudspeaker's frequency response causing the listener to perceive poorer quality reproduction. These problems represent a major barrier to high-quality sound reproduction. Thus, eliminating their acoustical affect upon a listener would be a major step in improving the sound quality of loudspeakers.

Heretofore, a wide variety of vibration damping methods have been proposed or implemented to reduce the acoustical output and therefore the perceived acoustical affect of enclosure panel vibrations upon the listener. However, these attempts have failed because the physical properties of the materials which have been used are not suitable to retard the extremely small periodic deformations (in the range of 20 to 20,000 hertz) such as those exhibited by the loudspeaker's enclosure panels, but which can nevertheless produce a relatively large magnitude of acoustic output.

One of these prior attempts employs rigid braces which are secured against the inner walls of the enclosure to resist the periodic forces which cause the enclosure panels to vibrate. Being rigid in nature, the braces are made of materials which classify them as an elastic solid. Having elastic material properties makes these braces suitable for transmitting energy but not for attenuating or absorbing energy. By "elastic solid" it is meant a material composed of individual atoms or small molecules in crystalline lattices. In these materials, molecular motion is rapid and short-range. As a result, whenever periodic forces having high velocity are exerted into such materials, they can produce rapid, short-range bending and stretching of interatomic bonds and rapid elastic response, thereby enabling them to transmit mechanical energy effectively. However, this molecular behavior also enables rigid enclosure braces made of such elastic materials to produce sound waves in the adjacent air through their ability to transmit periodic forces between the panels being braced. Through the nature of the elastic material, the result of such bracing does more to change the resonance frequencies of the panels than it does to absorb the offending mechanical energy and render its acoustical effect less disturbing to the listener.

Another method that has been proposed for reducing the acoustical output of enclosure panel vibrations has been to attach steel spikes directly to the bottom panel of the loudspeaker. These spikes are intended to penetrate carpets and ultimately embed themselves into the floor. This was done to route the mechanical energy originating in the loudspeaker's enclosure by transmitting it directly into the floor. The attempt in this design was to inject some of the energy which causes panel vibrations in the enclosure into the floor where it might be dissipated in the floor material. However, the absorption of mechanical energy in a floor using spikes as a medium of energy transmission and ultimate absorption is indeterminate and unpredictable in its results. After all, a floor may be made of concrete, hardwood, vitreous clay tile, linoleum or, for that matter, any number of materials, the physical properties of which vary as widely as does their ability to absorb energy in a useful way. For these reasons, the use of steel spikes fails to provide the means necessary to reduce the velocity and, hence, the amplitude of the enclosure vibrations to a degree that will render the perceived acoustical affect of such vibrations less disturbing to the listener.

Another available method which attempts to provide effective damping in a loudspeaker enclosure is the use of isolation pads. However, such isolation pads are commonly made of materials such as silicone or rubber. These materials are composed essentially of extremely high-molecular-weight molecules having long chains of repeating smaller molecules. These chemical bonds give such materials as silicone and rubber their low molecular flexibility. As a result, whenever forces are exerted into such materials, including high velocity periodic forces such as those exhibited by a loudspeaker enclosure panel, these materials act as barriers which prevent such energy from further propagation, thereby isolating the vibrational energy in the loudspeaker enclosure. For this reason the energy will not transfer out of the enclosure but will continue to produce periodic panel vibrations along with the corresponding objectionable delayed-energy sound waves.

The use of viscoelastic materials for damping has been discussed for certain applications. For example, U.S. Pat. No. 4,778,028 teaches the use of honeycomb-type structural layers mounted on opposite sides of a viscoelastic damping layer such that all of the layers have the same cross-sectional area. This design is said to provide structural stability to the surface to which the layer is attached, such as a satellite which will be subjected to various forces.

With regard to loudspeaker enclosures, Japanese Patent No. 62-209996 discloses one type of damping device that can be attached to a speaker box. However, the damping device of this patent does not address the use of viscoelastic materials in such an application.

SUMMARY OF THE INVENTION

To overcome the above-stated problems, the present invention provides a device for attenuating vibrations of selected wavelengths produced by a vibrating member. The device includes a vibration attenuating member that comprises five plate-shaped viscoelastic bodies and four pairs of edge-mounted spacers. Each pair of edge-mounted spacers is mounted between an adjacent pair of plate-shaped viscoelastic bodies.

The device also comprises a mounting device that includes a pair of edge-mounted blocks. The mounting device attaches a first one of the plate-shaped viscoelastic bodies to the vibrating member.

The relative cross-sectional areas of the viscoelastic bodies and the spacers are selected such that each of the viscoelastic bodies attenuates vibrations within a preselected band of wavelengths.

At least one of the plate-shaped viscoelastic bodies is severed across its width to form a two-piece plate-shaped viscoelastic body, and each piece of the two-piece plate-shaped viscoelastic body is mounted on one of a pair of edge-mounted spacers selected from the four pairs of edge-mounted spacers.

An alternative embodiment of a vibration attenuating device according to the invention comprises a plurality of viscoelastic plate-shaped bodies, and a mounting device, disposed between the vibrating panel and a first body, that transmits vibrations from the vibrating panel to the first body. The mounting device has a cross-sectional area relative to the cross sectional area of the first body such that the first body attenuates vibrations in a first preselected band of wavelengths. The first body is a first one of the viscoelastic plate-shaped bodies.

A first spacer is disposed between the first body and a second body and transmits vibrations between them. The first spacer has a cross-sectional area relative to the cross sectional area of the second body such that the second body attenuates vibrations in a second preselected band of wavelengths. The second body is a second one of the viscoelastic plate-shaped bodies.

A second spacer is disposed between the second body and a third body and transmits vibrations between them. The second spacer has a cross-sectional area relative to the cross-sectional area of the third body such that the third body attenuates vibrations within a third preselected band of wavelengths. The third body is a third one of the viscoelastic plate-shaped bodies.

The device also comprises fourth and fifth bodies, which are viscoelastic, plate-shaped, and are separated from one another by a first additional spacer. The fourth and fifth bodies are separated from the plurality of viscoelastic plate-shaped bodies by a second additional spacer. All of the spacers are positioned at the edges of the bodies. At least one of the bodies is severed across its width to form a two-piece body.

BRIEF DESCRIPTION OF THE DRAWINGS

The invention will be further described with regard to the attached drawings wherein:

FIG. 5 is a view of the vibration absorbing assembly of FIG. 1 mounted on a loudspeaker stand;

FIG. 6 is a side, partial cut away, view of a loudspeaker upon which the vibration absorbing assembly of FIG. 1 is mounted; and FIG. 7 is a line graph comparing the amplitude of enclosure panel vibrations without the damping system of FIG. 3 secured to the panel, and with the damping system of FIG. 3 secured to the panel.

DETAILED DESCRIPTION OF THE PREFERRED EMBODIMENT

Figure 1:
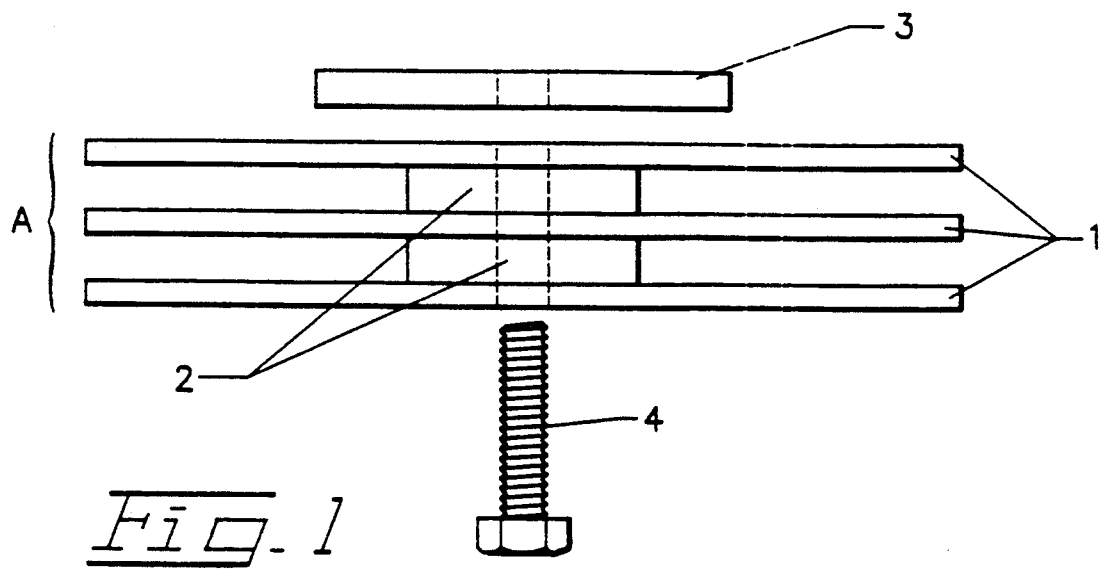
FIG. 1 is a side view of the first embodiment of the absorbing assembly of the present invention.

The preferred embodiments will now be described with respect to the drawings. The damping assembly shown in the drawings is described only by way of example and is not to be considered limiting. The device of the present invention may be modified in appearance without departing from important features of the invention itself, as detailed below.

Referring now to FIG. 1, a side view of the structure of the first embodiment is shown. In this structure, plates 1 of assembly A are separated by spacers 2. Plates 1 and spacers 2 are securely fixed together so as to form a monolithic structure. The spacers 2 serve two important functions according to the invention: first, they prevent the plates 1 from coming into contact with each other. Second, the cross-sectional area of the spacers relative to the plates can be made to govern the resonance frequency of plates 1 adjoining the spacers. It should be noted that, unlike plates 1, spacers 2 are not suspended and, therefore, do not attenuate vibrations. Consequently, the present invention can be constructed with spacers 2 made of elastic or viscoelastic material without impairing performance.

In this embodiment, mounting block 3 and bolt 4 may be used to affix the combination of plates 1 and spacers 2 which make up the vibration attenuating assembly A of the invention to an appropriate vibrating surface, such as a loudspeaker enclosure. It is noted, however, that assembly A may be mounted on vibrating surfaces other than speaker enclosures and still provide beneficial attenuating characteristics. Those skilled in this art will recognize that the dimensions of plates 1, the dimensions of the spacers 2, the dimensions of the plates 1 versus spacers 2, the type of viscoelastic material used for the plates 1, the type of viscoelastic or elastic material used for the spacers 2, and the distance between the plates and the vibrating member will define the wavelength band or bands to which assembly A is tuned. Thus, the assembly can be sized to absorb vibrations over a wide range of wavelengths.

Figure 2:
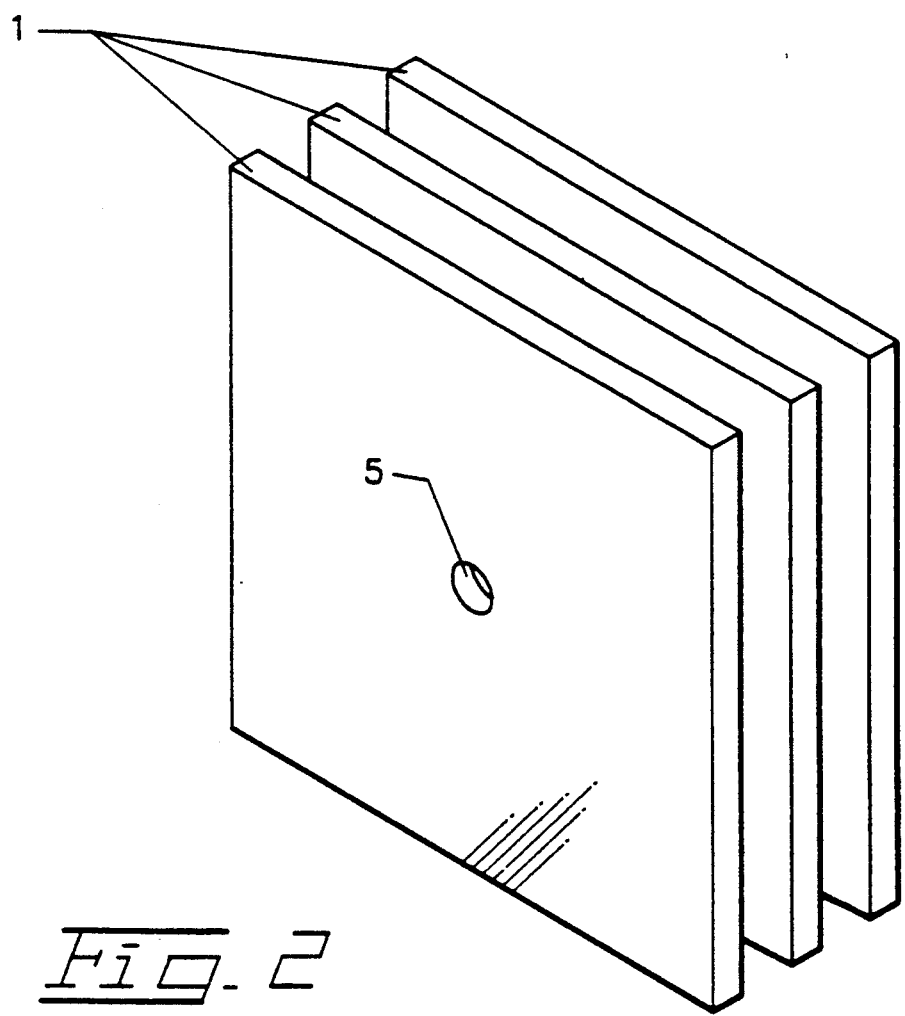
FIG. 2 is a perspective view of the sound absorbing assembly of FIG. 1.

A perspective view of the plates 1 of the first embodiment is shown in FIG. 2. Of course, spacers can not be seen in this view.

Therefore, in the first embodiment shown in FIGS. 1 and 2, the vibration damping device contains three absorption plates 1 with two intermediate spacers 2 between the plates. In this embodiment, the thickness of the absorption plates 1 is ⅛ of an inch and the thickness of the intermediate spacers 2 measures ¼ inch. The plates are of the same size and measure about 8 inches in height by 6 inches in width. It is to be noted, however, that these thicknesses and shapes may be substantially varied yet still obtain good attenuation characteristics. Varying thicknesses and cross-sectional areas of plates versus spacers, relative to one another simply adjusts the natural resonances of the assembly to different wavelength bands, and the particular wavelength band for a given construction is easily determined by applying vibrational stress to the assembly and measuring the resulting degree of absorption. This is most easily achieved by trial and error with the aid of standard accelerometer measuring techniques.

Also in the first embodiment of the invention, hole 5 (FIG. 2) with a diameter of approximately ⅜ inch, located at the center of the damping plates, passes directly through the vibration damping device, thereby providing a means for attaching the damping device directly onto a vibrating member. Mounting block 3, preferably made of the same material as the enclosure panel (usually particle board), has a threaded connector at its center (not shown). Through hole 5 in the vibration damping device, bolt 4 passes through to thread into the threaded connector of the mounting block. The block is preferably glued to the enclosure panel before the speaker enclosure is assembled. Mounting block 3 serves three important functions. First, it separates the vibration damping system away from the enclosure panel to prevent the absorption plate nearest the enclosure panel from striking the enclosure. Second, its size can be made to govern the resonance frequency of the absorption plate located nearest to the enclosure panel. Third, it forms the means necessary to secure the damping device onto the vibrating surface.

Figure 3:
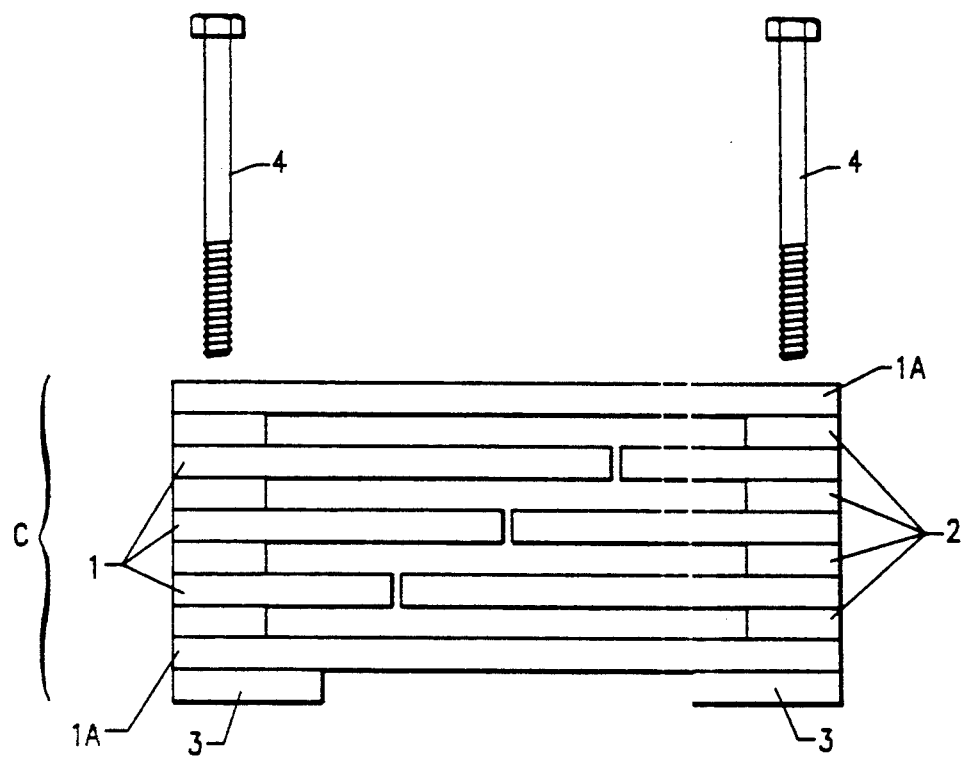
FIG. 3 is a side view of the second embodiment of the vibration absorbing assembly of the present invention.

Referring now to FIG. 3, a side view of the structure of the second embodiment is shown. In this structure, one-piece plates 1A and two-piece plates 1 of assembly C are separated by spacers 2. A two-piece plate 1 differs from a one-piece plate 1A in that the two-piece plate 1 is completely severed across its width so as to form two pieces of the plate. The two pieces are then spaced apart from each other so as not to be in vibrational contact with each other. The longitudinal location at which the plate is to be severed across its width will be chosen according to the wavelengths to be attenuated, and can vary from one two-piece plate to another. One-piece plates 1A, two-piece plates 1 and spacers 2 are securely fixed together so as to create a monolithic structure. In this embodiment, the mounting blocks 3 and bolts 4 may be used to affix the combination of plates 1 and spacers 2 which make up the vibration attenuating assembly C of the invention to an appropriate vibrating surface, such as a loudspeaker enclosure. It is noted, however, that assembly C may be mounted on vibrating surfaces other than speaker enclosures and still provide beneficial attenuating characteristics. Those skilled in this art will recognize that the dimensions of the one-piece plates 1A, the dimensions of the two-piece plates 1, the dimensions of the spacers 2, the dimensions of the one-piece plates 1A and the two-piece plates 1 versus spacers 2, the viscoelastic material of the one-piece plates 1A and the two-piece plates 1, the elastic or viscoelastic material of the spacers 2, and the distance between the plates and the vibrating member will define the wavelength band or bands to which assembly C is tuned. Thus, the assembly can be sized to absorb vibrations over a wide range of wavelengths.

Figure 4:
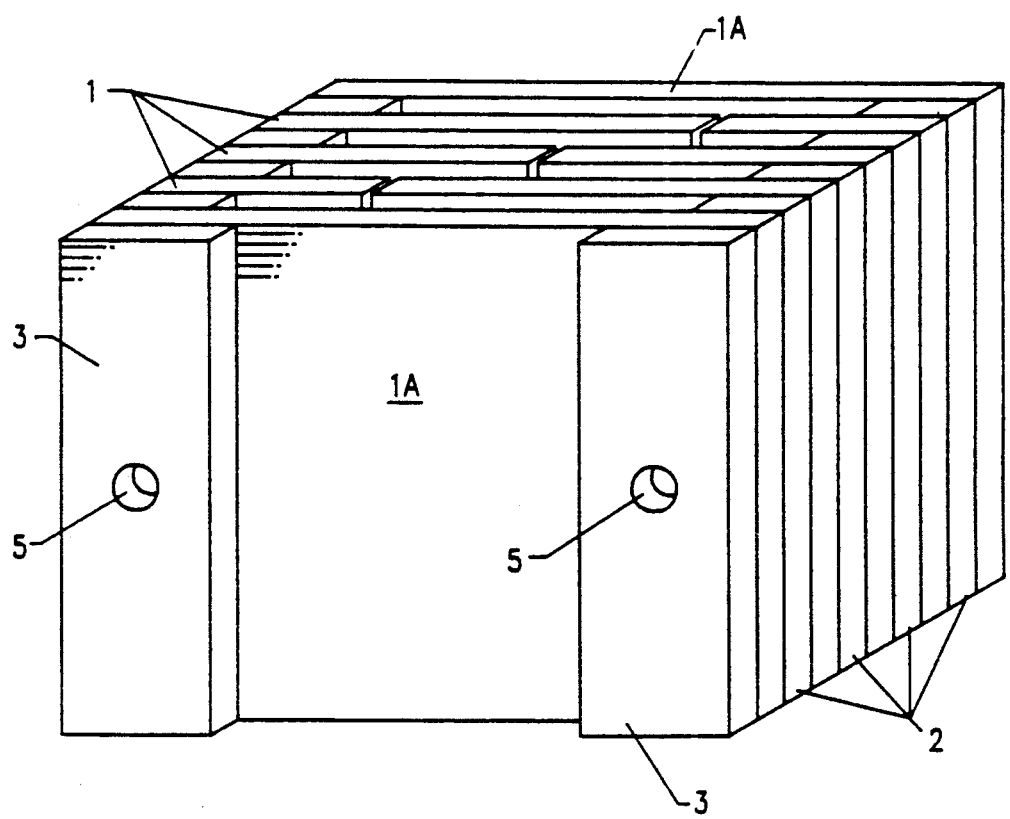
FIG. 4 is a perspective view of the sound absorbing assembly of FIG. 3.

A perspective view of the one-piece plates 1A and the two-piece plates 1 of the second embodiment is shown in FIG. 4. Spacers 2 can be seen in this view.

In the embodiment shown in FIGS. 3 and 4, the vibration damping device contains two one-piece absorption plates 1A, three two-piece absorption plates 1, and four pair of two intermediate spacers 2 between the plates such that one spacer separates each plate at either end of the plates. The thickness of the one-piece plates 1A and two-piece plates 1 is ⅛ of an inch and the thickness of the intermediate spacers 2 measures ¼ inch. The plates are of the same size and measure about 8 inches in height by 6 inches in width. In this embodiment, the lowest two-piece plate is severed across its width at a longitudinal point 3.5 inches from its left longitudinal end, the middle two-piece plate is severed across its width at a longitudinal point 4 inches from its left longitudinal end, and the highest two-piece plate is severed across its width at a longitudinal point 4.5 inches from its left longitudinal end, as shown in FIG. 3. The frequency range attenuated most substantially by the lower one-piece plate in FIG. 3 is approximately 190–350 hertz. The frequency range attenuated most substantially by the left segment of the lowest two-piece plate in FIG. 3 is approximately 750–1000 hertz, and is nearly identical to the range substantially attenuated by the right segment of the highest two-piece segment. The frequency range attenuated most substantially by the right segment of the lowest two-piece plate in FIG. 3 is approximately 300–625 hertz, and is nearly identical to the range substantially attenuated by the left segment of the highest two-piece segment. The frequency range attenuated most substantially by the left segment of the middle two-piece plate in FIG. 3 is approximately 390–750 hertz, and is nearly identical to the range substantially attenuated by the right segment of the middle two-piece plate. The frequency range attenuated most substantially by the upper one-piece plate in FIG. 3 is approximately 750–1000 hertz. It is to be noted, however, that these thicknesses, points of severance and shapes may be substantially varied to obtain attenuation characteristics at selected wavelengths. Varying thicknesses and cross-sectional areas of plates versus spacers, relative to one another simply adjusts the natural resonances of the assembly to different wavelength bands, and the particular wavelength band for a given construction is easily determined by applying vibrational stress to the assembly and measuring the resulting degree of absorption. This is most easily achieved by trial and error with the aid of standard accelerometer measuring techniques.

In the embodiment of FIG. 4 of the invention, the holes 5 with a diameter of approximately ⅜ inch, located at either end of the damping plates so as to be centered along the width of the plates, passes directly through the vibration damping device, thereby providing a means for attaching the damping device directly onto a vibrating member. The mounting blocks 3, preferably made of the same material as the enclosure panel (usually particle board), have a threaded connector at there center (not shown). Through each of the holes 5 in the vibration damping device, a bolt 4 passes through to thread into the threaded connector of each mounting block. The blocks are preferably glued to the enclosure panel before the speaker enclosure is assembled. The mounting blocks 3 serve three important functions according to the invention: first; they separate the vibration damping system away from the enclosure panel to prevent the absorption plate nearest the enclosure panel from striking the enclosure. Second, their size can be made to govern the resonance frequency of the absorption plate located nearest to the enclosure panel. Third, they form the means necessary to secure the damping device onto the vibrating surface.

The embodiment of FIGS. 3 and 4 is especially advantageous in practice because of the flexibility allowed by using the two piece plates to tune the assembly to attenuate at whatever wavelengths are desired, but still maintaining a small size so that the entire assembly will easily fit inside a speaker cabinet.

Those skilled in the art will also recognize that the number of plates and spacers can be varied. For example a single viscoelastic plate spaced by a single spacer or mounting block from a vibrating surface will absorb energy therefrom. Thus, the assembly may comprise a single plate and spacer, or two plates and two spacers. More plates provide greater ability to absorb energy, however, and a three plate assembly has been shown to be effective with loudspeakers for vibrations in the audible range. Other applications may require more, or larger or smaller, plates and spacers.

The absorption plates 1 may be made of any suitable viscoelastic material. By viscoelastic it is meant materials which have both elastic properties like a solid, and viscous properties like a liquid. When a viscoelastic body is subjected to sinusoidally oscillating stress, the strain on the body is neither exactly in phase with the oscillating stress, as it would be with a perfectly elastic solid, nor 90 degrees out of phase, as it would be with a perfectly viscous liquid. Rather, it is somewhere between these conditions. Thus, some of the vibrational energy input to the viscoelastic material of the plates is stored and recovered in each cycle of the vibrations, while some of the energy is dissipated as heat. This hysteresis loss attenuates the strength of the vibrations impacting upon the viscoelastic material.

Many polymeric materials exhibit such viscoelastic behavior and are therefore suitable for the absorption plates in the present invention. Polymers exhibit viscoelasticity due to the complicated molecular adjustments that take place during mechanical deformation of the material. When mechanical force is exerted on the long-chain, high-molecular-weight molecules of a polymer, rearrangement of the kinks, coils, and convolutions of these molecules occur resulting in conversion of mechanical energy into heat energy through friction. Thus, vibrating energy that is transmitted to the viscoelastic absorption assembly of this invention is absorbed and dampened, reducing the objectionable sound that is produced by the vibrating system to an almost inaudible level.

Viscoelastic polymeric materials that can be used to form the absorption plates and intermediate spacers include ABS (terpolymer of acrylonitrile, butadiene and styrene), polyamides such as nylon 66, polycarbonates, polyethylene, polypropylene, polystyrene, styrene-butadiene copolymers, polyfluorocarbons such as polytetrafluoroethylene and rubber-modified polystyrene.

A preferred material is high-impact polystyrene. These polymers have 8–10% butadiene or butadiene-styrene copolymers dispersed in a polystyrene matrix. An intermediate graft copolymer may be introduced to increase the compatibility between the polystyrene and butadiene phases.

High-impact styrene is particularly advantageous material for the absorption plates. As the periodic or sinusoidally oscillating forces originating in the vibrations transfer into the polystyrene matrix, these forces propagate directly through the polystyrene, which being the more rigid phase of the polystyrene matrix, facilitates energy propagation. In this process of propagation, the forces continually transfer across the interfacial bond between the rigid polystyrene phase of the polystyrene matrix and into the butadiene rubber particles which are finely dispersed throughout the polystyrene matrix (the rubbery phase). These discrete flexible units can, during energy propagation, repeatedly absorb and disperse high-velocity vibrational energy to and from the polystyrene rigid phase, thereby progressively diminishing the mechanical energy level and ultimately dissipate a major portion of the vibrational energy by converting it to heat energy.

An example of a high-impact polystyrene suitable for absorption plates and intermediate spacers according to the invention is STYRON ® 479 impact polystyrene resins. This high-impact polystyrene contains 8–10% butadiene and has a specific gravity of 1.05 g/cm$^3$ and a flexural strength of 4,700 lbs/in$^2$.

The plate and spacer design of the vibration damping assembly of this invention is an important feature of the invention. In order to achieve the objects of the invention, the absorption plates and intermediate spacers should be bonded together to form a monolithic structure. By monolithic it is mean that all elements of the absorbing structure are firmly in contact with one another, with no loose plates or spacers.

As mentioned, an important feature of the invention is the cross-sectional area of the absorption plates relative to the cross-section of the intermediate spacers. These areas can be varied to produce a desired resonance frequency or combination of resonance frequencies for the vibration damping device. The intermediate spacers and absorption plates are bonded together to form a monolithic structure and therefore, the absorption plates, being much larger in size than the intermediate spacers form a mass-spring system which will resonate sympathetically to a prescribed excitation frequency governed by the equation;

$$f_r = \frac{1}{2\pi \sqrt{MC}}$$

where M is Mass and C is Compliance. Such resonance frequencies will of course be governed in practice by the size of the absorption plates relative to that of the intermediate spacers. Since, as a practical matter, the overall size of the damping device of this invention may be limited by various loudspeaker enclosure sizes, the flexibility in adapting the size of the vibration damping device to a wide variety of enclosure sizes is a beneficial aspect that lends itself to exploration for a wide variety of individual applications. For example, where it is desired that the device attenuate more than one range of vibration wavelengths, plates of different sizes may be used in a single assembly.

Referring to FIG. 5, damping assembly A of the first configuration of the invention is shown mounted on speaker stand 7 which supports loudspeaker enclosure 8. It should be noted that, while damping assembly A effectively attenuates speaker vibrations when attached to a speaker stand as shown in FIG. 5, damping assembly A is shown for illustrative purposes only, and that damping assembly C of the second configuration of the invention can be mounted on the speaker stand in place of damping assembly A to effectively attenuate speaker vibration. The geometry of stand 7 may be any configuration which is aesthetically desirable as long as the material from which it is made is sufficiently elastic to efficiently transmit vibrations received from enclosure 8 to damping assembly A. The type of structure shown in FIG. 5 is desirable in that such a stand may be purchased by a consumer who already owns loudspeakers. In the structure shown in FIG. 5, the damping assembly may be mounted by any means which provides direct contact between the mounting block 9 and the base of speaker stand 7. For example, the damping assembly may be bolted or glued to the stand. It has also been found that the damping assembly may be sufficiently affixed to the stand (or speaker enclosure panel as further described below with regard to FIG. 6) by adhering a magnet to the speaker stand, or speaker enclosure itself, and a mating metal piece on the opposing surface of the damping assembly. The size of the magnet necessary will, of course, depend on the size and weight of the damping assembly used in a particular instance.

The material from which the spacers of the invention are made may be any suitable viscoelastic or elastic material, but may not be an insulating material such as soft rubber. For example, metal spacers may be used since these will readily transmit vibrations to the assembled vibration absorbing plates.

In order to minimize the weight of the assembly, however, it has been found that any suitable viscoelastic material used for the plates may also be used for the spacers. This has the advantage of decreasing the weight of the assembly and allows the plates and spacers to be tightly bonded to one another, for example, by use of acetone.

Referring to FIG. 6, loudspeaker 10 is shown housed within loudspeaker enclosure 11. The damping assembly A of the first configuration is shown mounted on the rear panel of enclosure 8. While damping assembly A is shown mounted on the exterior of enclosure 8, it has been found that equally effective damping is obtained if the assembly is mounted wholly within enclosure 8. Here again, it should be noted that damping assembly A has been chosen for illustrative purposes only, and that damping assembly C of the second configuration can be mounted in place of damping assembly A on the exterior or interior of the enclosure 8 to effectively attenuate loudspeaker vibrations. Where the damping assembly is included as an original piece by the loudspeaker manufacturer, it may be aesthetically desirable to contain the assembly within the enclosure.

It has been found that it is most advantageous to position either damping assembly on the side walls and the rear wall of the enclosure since these panels exhibit the greatest periodic deformations during operation of the loudspeaker. Adequate damping may, however, be achieved by placing the damping assembly in any portion of the loudspeaker enclosure where a modal analysis of the enclosure indicates portions which would benefit most.

The invention further includes a novel method of attenuating vibrations in a selected wavelength band emanating from a vibrating source by contacting a viscoelastic absorbing body to the source. In this method the viscoelastic body may be mounted to and contacted directly with the vibrating source. Alternatively, the body may be mounted on any material which will transmit vibrations from the vibrating source to the viscoelastic assembly, such as a stand formed from an elastic material, upon which the vibrating source rests.

Experiment has shown that significant improvement in sound reproduction from a loudspeaker is achieved by use of the damping assembly and method of the invention. For example, a test was conducted wherein a pulse of energy was input to a high quality loudspeaker within a speaker enclosure. An accelerometer was attached to the top of the back panel of the enclosure to measure vibrations resulting from the pulse through the speaker. The output of the speaker and associated interfering vibrations from the enclosure were measured over a frequency range of about 30 to over 1000 hertz, the output being measured in decibels.

As indicated in FIG. 7, it was found that the system (speaker plus enclosure) output without damping ranged from about 5 to about 35 decibels over the test band of frequencies. This output dropped 7 to 10 decibels over the same band when the damper assembly of the invention (FIGS. 3 and 4) was contacted with the top back panel of the speaker enclosure. A significant improvement in the quality of the sound which reaches the listener was achieved.

What is claimed is:

1. A device for attenuating vibrations of selected wavelengths produced by a vibrating member, the device including a vibration attenuating member, the vibration attenuating member comprising:
    five plate-shaped viscoelastic bodies, each plate-shaped viscoelastic body having a cross-sectional area;
    four pairs of edge-mounted spacers, each pair of edge-mounted spacers being mounted between an adjacent pair of plate-shaped viscoelastic bodies, each spacer having a cross-sectional area; and
    a mounting means, comprising a pair of edge-mounted mounting blocks, for attaching a first one of the plate-shaped viscoelastic bodies to the vibrating member, wherein
        the relative cross-sectional areas of the viscoelastic bodies and the spacers are selected such that each of the viscoelastic bodies attenuates vibrations within a preselected band of wavelengths, and
        at least one of the plate-shaped viscoelastic bodies is severed across its width to form a two-piece plate-shaped viscoelastic body, each piece of the two-piece plate-shaped viscoelastic body being mounted on one of a pair of edge-mounted spacers selected from the four pairs of edge-mounted spacers.

2. A device for attenuating vibrations emanating from a vibrating panel comprising:
    (a) a plurality of viscoelastic plate-shaped bodies, each of the viscoelastic plate-shaped bodies having a cross-sectional area;
    (b) a mounting means, disposed between the vibrating panel and a first body, the first body being a first one of the viscoelastic plate-shaped bodies, for transmitting the vibrations from the vibrating panel to the first body, the mounting means having a cross-sectional area relative to the cross sectional area of the first body such that the first body attenuates vibrations within a first preselected band of wavelengths;

(c) first spacer means disposed between the first body and a second body, the second body being a second one of the viscoelastic plate-shaped bodies, for transmitting vibrations therebetween, the first spacer means having a cross-sectional area relative to the cross sectional area of the second body such that the second body attenuates vibrations within a second preselected band of wavelengths;

(d) second spacer means disposed between the second body and a third body, the third body being a third one of the viscoelastic plate-shaped bodies, for transmitting vibrations therebetween, the second spacer means having a cross-sectional area relative to the cross-sectional area of the third body such that the third body attenuates vibrations within a third preselected band of wavelengths; and (e) fourth and fifth bodies, the fourth and fifth bodies being viscoelastic, plate-shaped, and being separated from one another by a first additional spacer means, and being separated from the plurality of viscoelastic plate-shaped bodies by a second additional spacer means, all of the spacer means being positioned at the edges of the bodies, wherein at least one of the bodies is severed across its width to form a two-piece body.

3. The device according to claim 2, wherein at least three of said bodies are severed across their widths to form at least three two-piece bodies.

4. The device according to claim 3, wherein said spacer means are metal.

* * * * *